United States Patent
Mergen et al.

(10) Patent No.: US 6,506,503 B1
(45) Date of Patent: Jan. 14, 2003

(54) FRICTION BEARING HAVING AN INTERMEDIATE LAYER, NOTABLY BINDING LAYER, MADE OF AN ALLOY ON ALUMINIUM BASIS

(75) Inventors: Robert Mergen, Wels (AT); Markus Manner, Mauer (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 09/744,585

(22) PCT Filed: Jul. 27, 1999

(86) PCT No.: PCT/AT99/00188

§ 371 (c)(1),
(2), (4) Date: Feb. 26, 2001

(87) PCT Pub. No.: WO00/06788

PCT Pub. Date: Feb. 10, 2000

(30) Foreign Application Priority Data

Jul. 29, 1998 (AT) .............................................. 1301/98

(51) Int. Cl.⁷ .......................... B32B 15/20; B32B 31/04
(52) U.S. Cl. ...................... 428/650; 148/531; 148/534; 148/535; 384/445; 384/907; 384/912; 428/653; 428/654; 428/908.8; 428/936; 428/937; 428/938; 428/939
(58) Field of Search .................................. 428/650, 653, 428/654, 908.8, 936, 937, 938, 939; 148/531, 534, 535, 437; 384/445, 907, 912

(56) References Cited

U.S. PATENT DOCUMENTS

| | | |
|---|---|---|
| 4,816,087 A | 3/1989 | Cho |
| 4,857,267 A | 8/1989 | Maki et al. |
| 4,874,440 A | 10/1989 | Sawtell et al. |
| 5,055,257 A | 10/1991 | Chakrabarti et al. |
| 5,226,983 A | 7/1993 | Skinner et al. |
| 5,620,652 A | 4/1997 | Tack et al. |

FOREIGN PATENT DOCUMENTS

| | | |
|---|---|---|
| DE | 30 00 772 | 7/1981 |
| DE | 40 37 746 | 6/1991 |
| DE | 43 12 537 | 11/1993 |
| EP | 0 158 769 | 10/1985 |
| EP | 0 562 400 | 9/1993 |
| EP | 0 672 840 | 8/1995 |
| EP | 0 710 730 | 5/1996 |
| FR | 2 717 827 | 9/1995 |
| JP | 61-079023 | 4/1986 |
| JP | 62-224772 | 10/1987 |
| WO | WO96/10099 | 4/1996 |
| WO | WO97/22725 | 6/1997 |
| WO | WO98/17833 | 4/1998 |

OTHER PUBLICATIONS

Sawtell et al. (1988) "Exploratory Alloy Development in the System Al–Sc–X", The Minerals, Metals and Materials Society, pp. 409–420. (No Month Given).

Vetrano et al. (1997) "Influence of the Particle Size on Recrystallization", Materials Science and Engineering A238, pp. 101–107. (No Month Given).

Tan et al. "The Ageing Behavior and Tensile Properties of Al–Sc Alloy", The 3$^{rd}$ International Conference on Aluminuium Alloys, pp. 290–204. (No Date).

Primary Examiner—Robert R. Koehler
(74) Attorney, Agent, or Firm—Collard & Roe P.C.

(57) ABSTRACT

The invention relates to an intermediate layer, in particular a bonding layer, made from an alloy with an aluminium base, for multi-layered materials with layers of differing composition, in particular friction bearings. The alloy contains added quantities of at least one element from a group of elements consisting of Sc, Y, Hf, Nb, Ta, La, lanthanides and actinides in a maximum of 10% by weight, preferably 4% by weight, in particular between 0.015% by weight and 3.25% by weight, relative to 100% by weight of alloy, the remainder being aluminium with smelt-related impurities.

21 Claims, 2 Drawing Sheets

FRICTION BEARING HAVING AN INTERMEDIATE LAYER, NOTABLY BINDING LAYER, MADE OF AN ALLOY ON ALUMINIUM BASIS

CROSS REFERENCE TO RELATED APPLICATIONS

Applicants claim priority under 35 U.S.C. §119 of AUSTRIAN Application No. A 1301/98 filed Jul. 29, 1998. Applicants also claim priority under 35 U.S.C. §120 of PCT/AT99/00188 filed on Jul. 27, 1999. The international application under PCT article 21 (2) was not published in English.

The invention relates to friction bearing having an intermediate layer with an aluminium base intended to enhance the mechanical properties of metallic substances of differing composition and a method of producing this friction bearing.

It is becoming more commonplace for multi-layered materials, in particular those used in plain bearings for components designed to rotate at high speeds, e.g. motor shafts, to be made such that the layered materials have a structure comprising basic shell bonding layer-bearing shell, especially if the bearing shell is made from a light metal alloy. The bonding layer fulfils an important function, particularly if the light metal alloy contains mechanically soft components such as tin, lead or similar, for example.

It is common practice to use a pure aluminium which is technically pure for the bonding layer, e.g. A 199.5. Over the course of development, light metal bearing alloys designed for use in modern motors and machinery have been required to withstand increasingly high loads and are fast becoming the weakest link of the multi-layered material. For example, pure aluminium has now been found to have distinct disadvantages as regards dynamic strength and heat resistance as compared with the new generation of light metal-bearing alloys.

Various concepts have already been suggested as a means of alleviating these problems. DE 40 37 746 Al and DE 43 12 537 Al, for example, propose using hardenable aluminium alloys for the bonding layer. However, since the production process used to join layers also involves several heat treatments, these hardenable materials rank on the highest level of strength in terms of their structure. In addition to a partially inadmissible adverse effect on the desired ductility, there is also the risk of over-ageing and hence an undesirable reduction in the service life of the finished product when the bearing point is subjected thermal and dynamic load.

A totally different approach is to use nickel, copper or similar layers, galvanised onto the base shell and dispense with an aluminium-based bonding layer altogether. Because of the low metallurgical affinity between bearing alloys of light metal on the one hand and nickel, copper or similar on the other, the bonding strength remains limited by the degree of adhesion and clamping, whereas if using pairs comprising a bonding layer of light metal/light metal bearing layer the adhesive joining forces produced in the bonding plane by means of heat treatment and diffusion improves the strength of an increased number of layers, which virtually exhibit the traits of metallurgical diffusion and reaction zones.

Various different aluminium alloys for friction bearings or friction bearings of differing compositions are known from WO 98/17833 A, WO97/22725 A, EP 0 672 840 A and DE 30 00 772 A. The different compositions of alloys described therein are intended to improve the durability of the soft phases, including those present in particularly high proportions, dispersed in the aluminium alloy. A number of ways of achieving this objective are described, for example by embedding hard particles as a means of interrupting an end-to-end tin network. EP 0 672 840 A in particular proposes a solution which involves using a hardenable aluminium alloy as an intermediate layer for friction bearings.

The underlying objective of the invention is to provide an intermediate layer with an aluminium base which will improve the quality of the bonding material, for example its mechanical properties, by matching the individual layers with one another more effectively.

This objective is achieved by a friction bearing having at least three layers of differing composition, at least one intermediate layer being made from an alloy with an aluminum base containing 0.015% by weight to 10% by weight of at least one element from the group consisting of So, Y, Hf, Ta, La, lanthanides and actinides and optionally a total of up to 12% by weight of at least one element from the group consisting of Li, Zn, Si, Mg or up to a total of 10% by weight of at least one element from the group consisting of Ma, Cu, Be, Ca, Zr, Mo, W, Ag or up to a total of 10% by weight of at least one element from the group consisting of Ti, V, Cr, Fe, Co, Ni or up to a total of 10% by weight of at least one element from the group consisting of Pd, Au, Pt, In, Ge, Sn, Pb, Sb, Bi, Te, and the remainder being formed by aluminum with smelt-related impurities. The advantage here is that an intermediate layer for a friction bearing made from an Al alloy can be provided, which does not exhibit any marked hardening behaviour whilst exhibiting a high ductility due to the finely dispersed distribution of $A_3M$-phases and, in spite of the breakdown of solidified materials occurring during the manufacturing process due to heat treatments, high values of mechanical strength can be preserved. As a result, a product can be made which exhibits good thermal, static and dynamic stability. This intermediate layer is particularly well suited to plain bearings and the anti-friction layer of such plain bearings can be made from high-strength materials of a new kind. The advantage of this is the fact that this intermediate layer or the material used to produce it may have a high re-crystallisation temperature, which means that heat treatments or deformation processes can be performed at increased temperatures without giving rise to an undesirable reduction in hardness. Yet another advantage is that because of the possibility of using multiple combinations of individual elements, material characteristics can be freely adjusted within specific limits, thereby enabling the inherent cost of producing the intermediate layer to be controlled accordingly. On the other hand, however, being able to introduce radioactive elements or isotopes such as $U_{235}$ into the alloy simultaneously means that tracers can be incorporated in the alloy for test purposes so as to monitor the behaviour of the material on different test machines.

By using different proportions of the large number of possible element combinations, particularly when using the intermediate layer as a bonding layer for a friction bearing, this layer can be readily adapted to specific requirements, in particular to the properties of the other layers comprising the friction bearing. The effects which can be achieved by introducing the specified elements into the alloy can be taken from the detailed description below.

Also different heat treatments provide an intermediate layer whose hardness is high enough to allow this intermediate layer to be combined with higher-strength materials such as new types of bearing materials, for example, and the process used to produce these intermediate layers can be shortened since it is possible to operate heat treatments at higher temperatures.

According to another aspect of the invention, a method is provided for producing a friction bearing, wherein the intermediate layer made from a previously hardened material made by a casting process, an extrusion process or a continuous casting process is rolled with at least one other material. As a result, the friction bearing can be made so that it has a surface which is suitable as a bearing for shafts rotating at high speed on the one hand, and, on the other hand, has a coating by means of which the forces transmitted onto the multi-layered material can be transferred. Advantageously, the quality of the bonding can be improved since the properties are intrinsic to multiple layers of the aluminum base.

The layers of the friction bearing may be rolled together and are tempered after every overall forming process by at least 25% and at most 91% in one or more forming step at a temperature in the range of between 85° C. and 445° C. This is of advantage because undesirable tension can be released after each massive forming process.

The friction bearing can be made by a whole range of possible methods, which means that the method best suited to the desired friction bearing can be selected. Thus, an anti-friction layer may be applied on top of the intermediate layer or the intermediate layer may be applied on top of the anti-friction layer and/or the intermediate layer may be applied on top of a base shell by a rolling process, a CVD process, galvanic processing, cathode sputtering, or a vacuum vapor deposition process.

The thickness of intermediate products of the friction bearing may be reduced by means of a plating process in a rolling mill in the range of 20% to 75% with each pass. Thus, the number of individual method steps can be selectively controlled during the plating process so that the manufacturing costs or time needed can also be controlled accordingly.

Advantageously, the friction bearing may be used as a thrust ring or thrust washer.

In order to provide a clearer understanding, the invention will be described in more detail below with reference to the appended drawings.

Of these:

Firstly, it should be pointed out that the same parts described in the different embodiments are denoted by the same reference numbers and the same component names and the disclosures made throughout the description can be transposed in terms of meaning to same parts bearing the same reference numbers or same component names.

Furthermore, individual features or combinations of features from the different embodiments illustrated and described may be construed as independent inventive solutions or solutions proposed by the invention in their own right.

Figure 1:
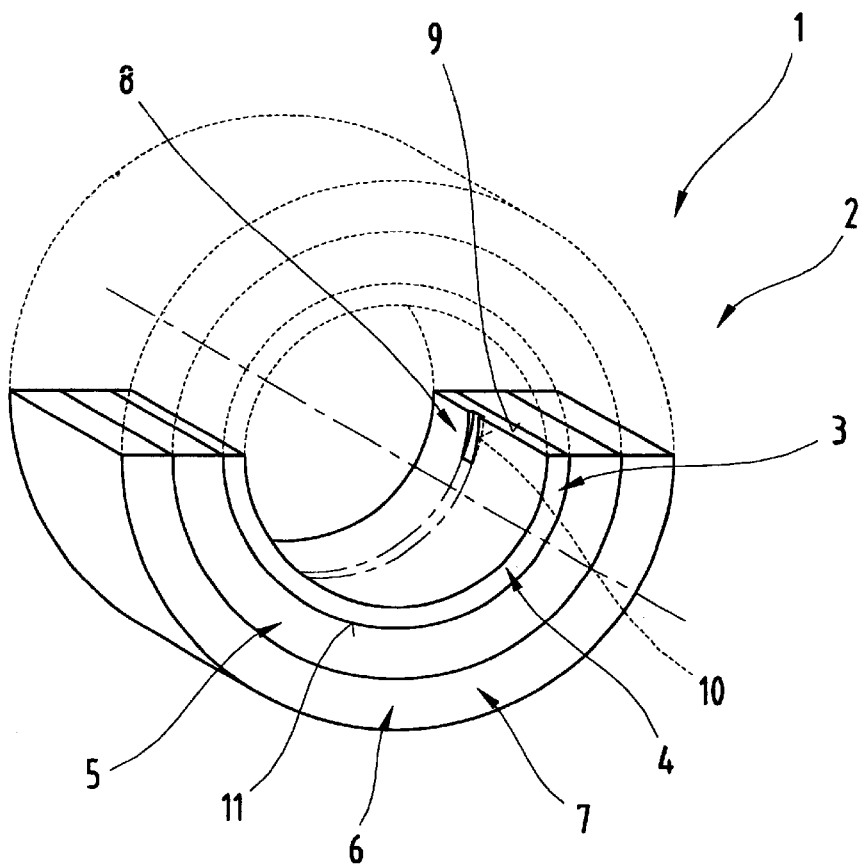
FIG. 1 is a very simplified diagram of the bonding layer used to impart adhesion in a friction bearing as proposed by the invention.

FIG. 1 illustrates a multi-layered material 1 as proposed by the invention, for example in the form of a friction bearing 2. Although the description concentrates on an anti-friction bearing 2 as an example of one application of this multi-layered material 1, this does not mean that the use of the multi-layered material 1 is restricted and in fact, on the contrary, the multi-layered material 1 finds numerous conceivable and different embodiments and applications, for example where a steel base shell is dispensed with or in which the steel base shell is replaced by other materials, e.g. for manufacturing thrust bearings or thrust washers and for known designs of friction bearings 2 subjected to radial or axial loads.

The multi-layered material 1, in particular the friction bearing 2, usually comprises a first peripheral layer 3, hereafter referred to as the anti-friction layer 4, an intermediate layer 5 and a second a peripheral layer 6, hereafter referred to as the base shell 7. Again, this structure is not restrictive and in particular several layers of a same and/or different composition may be incorporated between the anti-friction layer 4 and the base shell 7, in which case the specific layout may be varied depending on the intended application.

The hardness of the individual layers of the multi-layered material 1 is preferably different and in particular increases starting from the first peripheral layer 3 in the direction towards the second peripheral layer 6 opposing it. Clearly, however, it would also be possible to arrange layers of differing hardness values in the opposite direction or to provide two or more layers may of a same, mean hardness. If the multi-layered material 1 is used in a friction bearing 2, however, it has proved to be of advantage if the anti-friction layer 4 has the lowest hardness and the base shell 7 is the hardest.

As may be seen from FIG. 1, the bearing member is designed as a half-shell. Clearly, however, it would also be possible to make full-shell variants using the multi-layered material 1 proposed by the invention, as shown by the broken lines in FIG. 1.

Bearing members, e.g. friction bearings 2, are generally used to support rotary components, e.g. shafts for machines, motors, etc. Since these shafts are normally operated at high rotation speeds—with the exception of the run-up and shut-down phase—it is necessary to prevent driving friction on the bearing and shaft. One possible way of doing this, apart from designing the anti-friction layer 4 as an aluminium alloy with a high proportion of tin, is to provide a groove 8 in the anti-friction layer 4, in which an appropriate lubricant such as oil can be placed and guided. This groove 8 may either be provided in the form of a flat groove having side walls 10 which become wider in the direction of an end face 9 and/or as a circumferential groove, as illustrated by the dotted-dashed lines of FIG. 1. Clearly, there are other possible ways of introducing lubricants, e.g. by end-to-end bores.

The groove 8 may also serve as a means of picking up any solid particles which might result from friction on the anti-friction layer 4 for example, which may optionally be carried away with the lubricant. It would also be possible for at least one of the edges of the anti-friction layer 4 opposite a surface 11 to be discontinuous, thereby enabling undesirable solid particles to be carried away to the side.

The individual layers of the multi-layered material 1, in particular of the friction bearing 2, are joined so as to prevent any displacement, e.g. by plating, rolling, welding, bonding, clamping, etc., in order to ensure that the load is reliably transmitted. In selecting joining methods, particular care should be taken to allow for high loads, in particular increased temperatures.

The base shell 7 may be made from a metallic substance such as steel or similar and should absorb some of the forces transmitted to the anti-friction layer 4 from a shaft.

Although the description below relates to a friction bearing 2 with a structure of three layers, it would, of course, also be possible for such a friction bearing 2 to be made with two layers. This is a distinct possibility more especially if the alloys used for the intermediate layer 5 are specifically selected as a means of producing a hardness capable of assuming and transmitting the forces which arise or if the intermediate layer 5 is selected to have properties that will support the functions of the anti-friction layer.

The intermediate layer 5, which in particular may operate as a bonding layer between the individual layers adjacent thereto, e.g. the anti-friction layer 4 and the base shell 7, preferably consists of an alloy with an aluminium base, the alloy having a content of scandium (Sc) in added quantities of a maximum 10% by weight, preferably 4% by weight, and in particular between 0.015% by weight and 3.25% by weight, the remainder being aluminium (Al) with the usual impurities which occur during smelting. All the specified quantities given here for the composition of alloys should be understood as proportions by weight relative to 100% by weight of the total alloy.

It has also proved to be of particular advantage if the scandium content of the aluminium alloy is between 0.015% by weight and 2.5% by weight or between 0.015% by weight and 1.0% by weight.

In addition to Sc, other elements may also be incorporated in the alloy as a means of adjusting or improving the properties of the intermediate layer 5. For example, Sc may be at least partially replaced by an element from the group consisting of yttrium (Y), hafnium (Hf), niobium (Nb), tantalum (Ta) and lanthanum (La) or Sc may be at least partially replaced by at least one element from the group consisting of lanthanides, for example cerium (Ce), praseodym (Pr), neodym (Nd), promethium (Pm), samarium (Sm), europium (Eu), gaudolinium (Gd), terbium (Tb), dysprosium (Dy), holmium (Ho), erbium (Er), thulium (Tm), ytterbium (Yb) or lutetium (Lu). Alternatively, it is also possible to replace the Sc, at least partially, by an element from the group consisting of actinides, such as thorium (Th), protactinium (Pa), uranium (U) or similar, for example.

In addition, the aluminium alloy may contain other elements for modifying the structure or for modifying its properties. For example, it would be possible to incorporate at least one element from the group consisting of lithium (Li), zinc (Zn), silicon (Si) or Magnesium (Mg) in a maximum quantity in total of 12% by weight, preferably a maximum of 6.5% by weight and in particular a maximum of 4.2% by weight. Moreover, the aluminium alloy of the intermediate layer 5 may also contain at least one element from the group consisting of manganese (Mn), copper (Cu), beryllium (Be), calcium (Ca), zircon (Zr), molybdenum (Mo), tungsten (W) or silver (Ag) in a maximum quantity of 10% by weight in total, preferably a maximum quantity of 5% by weight, in particular a maximum of 1.5% by weight. It would also be possible to incorporate at least one element from the group consisting of titanium (Ti), vanadium (V), chromium (Cr), iron (Fe), cobalt (Co) or nickel (Ni) in the alloy in a total maximum quantity of 10% by weight, preferably a maximum of 4% by weight, in particular 1.5% by weight. Furthermore, the alloy might additionally contain at least one of the elements from the group consisting of palladium (Pd), gold (Au), platinum (Pt), indium (In), germanium (Ge), tin (Sn), lead (Pb), antimony (Sb), bismuth (Bi), tellurium (Te) in a maximum quantity of 10% by weight in total, preferably a maximum of 6.5% by weight.

The properties of the aluminium alloy can be specially adjusted to suit specific purposes by incorporating the alloying elements listed above.

Adding Sc to Al-alloys is a practice that has long been known. For example, structural materials with an aluminium base containing added quantities of scandium are known from the prior art and are primarily used in space travel and the aircraft industry. Not only are these alloys light weight, they also exhibit the property of super-elasticity, which is mainly attributable to a highly degenerative re-crystallisation behaviour.

Aluminium-lithium alloys, for example, are known form U.S. Pat. No. 5,226,983 A, EP 0 158 769 B1 and U.S. Pat. No. 4,816,087 A, which contain a greater or lesser proportion of added quantities of scandium. The possibility of using these alloys as a structural material is primarily due to precipitations of tri-aluminides. e.g. $Al_3Li$, $Al_3Zr$ or $Al_3Sc$. $Al_3Sc$ precipitations of this type are also described in both U.S. Pat. No. 4,874,440 A and U.S. Pat. No. 5,055,257 A. They discuss the possibility of replacing the scandium partially or in full with an element from the group consisting of the lanthanides and state that, in obtaining the desired properties of the structural materials, it is important that the tri-aluminides mentioned should be contained in the aluminium matrix.

Al alloys which contain Zr and a number of other elements in addition to Sc are known from U.S. Pat. No 5,620,652 A. In this U.S. patent, a plurality of possible options is described, for example for fitness equipment, structural materials for the aircraft industry, the automotive industry or for applications in the marine sector. One of the advantages is stated as being that by using these alloys in the specified applications, the mass to be displaced, in other words the weight, can bring a not inconsiderable saving on the quantity of fuel needed, whilst preserving mechanical strength.

As may be seen from the paragraphs above, these alloys have long been regarded as important, particularly in the field of structural materials. The possibility of using Al—Sc alloys of this type as multi-layered materials 1, however, in particular for friction bearings 2, has not been disclosed until now.

Having specifically endeavoured to seek out new possibilities of improving the quality of multi-layered materials 25, the applicant has now found, surprisingly, that Al—Sc alloys are especially suitable for use as multi-layered materials 1, in particular friction bearings 2. In the case of friction bearings 2 of a structure comprising anti-friction layer 4/intermediate layer 5/base shell 7, it is important for the intermediate layer to be able to assume a function whereby it imparts adhesion between the anti-friction layer 4 and the base shell 7. To this end, the intermediate layer 5 should combine, as far as possible, at least a part of the mechanical and/or chemical properties of said two other layers, thereby affording a more or less continuous transition of the properties between the individual layers.

The fact that $Al_3Sc$ precipitations occur if Sc is incorporated in Al-alloys has been found to be of advantage. This inter-metallic tri-aluminide phase crystallises with a cubic primitive structure (three-dimensional group Pm3m) and is isotypical of the $Cu_3Au$ structural type. The Sc atoms are located at the corners of the unit cell. The Al atoms assume the face-centred positions, in other words ½/½/0, ½/0/½, etc., for example. In metallic aluminium, on the other hand, the aluminium atoms are known to assume the positions in a cubic face-centred lattice. Because of the slight difference in the metal radii of Sc (162 pm, co-ordination number 12) and aluminium AL (143 pm, co-ordination number 12) (covalent bond proportions are optionally overlooked), it can be assumed that the tri-aluminide of the $Cu_3Au$ type will also assume at least an almost hypothetically cubic face-centred structure. Because, in addition, the lattice parameters of aluminium (a=0.4049 nm) and $Al_3Sc$ (a=0.4105 nm) are comparable, what are referred to as coherent phases occur, i.e. the lattice network lines of the aluminium matrix are disrupted but not interrupted. As a result, good deformability is imparted to these alloys, due to the ever present occurrence of displacements, as is the case in sliding directions along the octahedral surfaces {111} which occur with cubic face-centred crystals. Each of these slide planes in turn contains three slide directions of equal value <110>, making slip possible in 12 different sliding systems.

In addition to the good ductility of this Al—Sc material, however, another advantage is the fact that Al-alloys of this type do not exhibit any marked hardening behaviour. As a result, optimum adherence strength can be achieved between the individual layers of the multi-layered material. However, the hardness may be varied by other alloying elements, as will be described in more detail below. In particular, the hardness of this intermediate layer 5 may be adjusted so that its value lies between the hardness of the anti-friction layer 4 and the base shell 7.

Another advantage of these Al—Sc alloys is that high mechanical strength values are maintained in spite of the break-down of solidified material due to heat treatments during the production process. As a result, corresponding thermal, static and dynamic strength can be achieved in the product. The inter-metallic tri-aluminides mentioned above, for example $Al_3Sc$, are partially responsible for these properties.

Figure 2:
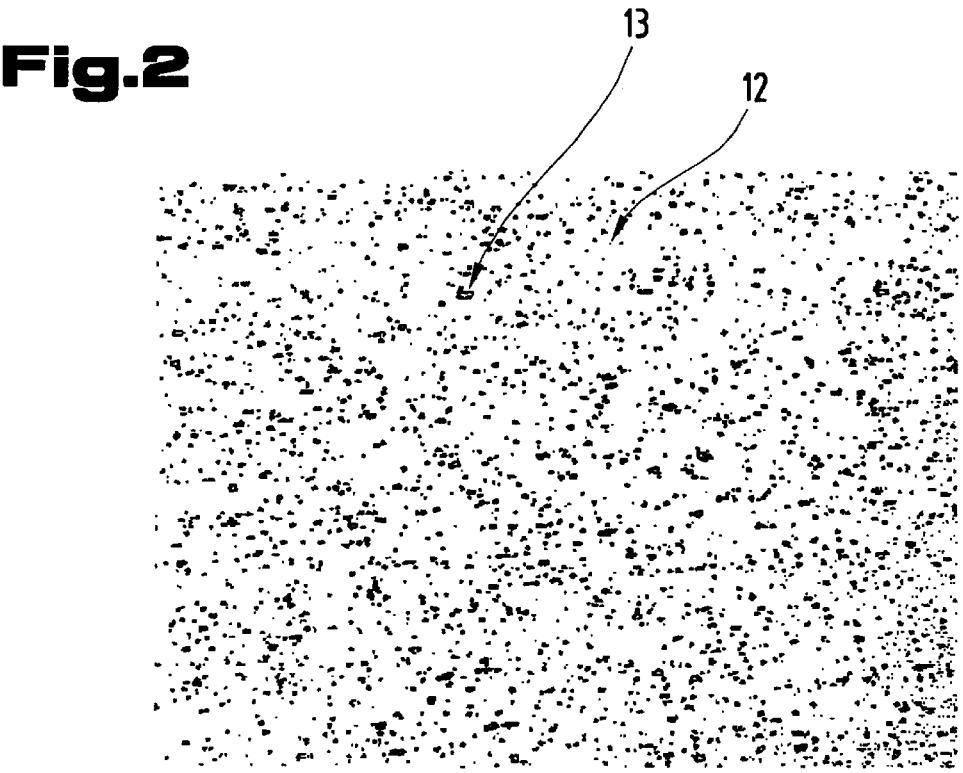
FIG. 2 shows the grain pattern of the intermediate layer with finely dispersed $Al_3Sc$ precipitations.

FIG. 2 illustrates one of the possible Al—Sc alloys, the composition of which is Al Mn 0.5, SC 0.15. It is clearly evident from the intermediate layer 5 in this grain pattern that $Al_3Sc$ crystallite 12 is finely dispersed as stable, spherical precipitations in the aluminium matrix. In addition different binary Al—Mn precipitations 13 can be clearly distinguished by their dimensions. This finely dispersed pattern structure is made possible due to the coherence of the $Al_3Sc$ crystallite 12 relative to the aluminium matrix. In conjunction, the capacity for displacement perpendicular to the slide planes and the re-crystallisation behaviour can be reduced by increasing the re-crystallisation temperature. Furthermore, coalescence of the sub-grains is prevented as far as possible. In comparison with conventional refiners such as Ti, Zr, Mn, etc., for example, the Al—Sc dispersoids are capable of absorbing a greater volume fraction due to their improved solubility.

As a result of this fine distribution of the $Al_3Sc$ crystallite 12, it is also possible that micro-tears which occur within the Al—Sc alloy "run dead" on these $Al_3Sc$ crystallites, thereby producing improved mechanical properties. Due to the heterogeneous seed formation, caused by the high temperature of the Al—$Al_3Sc$ eutectics, susceptibility to hot tearing can be reduced, for example, and, in addition, the weldability of alloys of this type can be improved so that a better bond is possible between the individual layers of the multi-layered material 1.

The larger volume fraction of the Sc is an important factor in preventing re-crystallisation and protects against annihilation of the sub-grains. The high coherence can also prevent displacement of the grain boundaries, thereby enabling a finer grain pattern to be achieved.

Re-crystallisation temperatures of up to 600° C. can be achieved if a quantity of Sc is incorporated. By comparison, aluminium alloys containing manganese (325° C.), chromium (325° C.) or zirconium (400° C.) have significantly lower re-crystallisation temperatures. The advantage which can be achieved by this feature is the improved capacity to process alloys of this type, i.e. processing can take place at higher temperatures without having to make allowance for any reduction in mechanical strength to speak of due to re-crystallisation. Re-crystallisation is caused, for example, by the fact that a cold formed metal, such as a rolled metal, is in a forced state and when heat is applied to the metal, e.g. when friction bearings are used in motors with shafts rotating at high speeds for example, tries to break down the deformation stress and repair disruptions in the lattice. This would be associated with a significant reduction in the mechanical properties, for example the hardness of these alloys, and would therefore significantly reduce the service life of friction bearings 2, for example, i.e. the periods between maintenance and hence the maintenance costs would be increased by a significant factor.

Over-ageing of alloys of this type can be improved due to the thermal stability of $Al_3Sc$ crystallite 12.

The intermediate layer 5 proposed by the invention and made from $Al_3Sc$ crystallite 12 may have a grain size in the region of between 0.005 $\mu$m and 5 $\mu$m, preferably between 0.1 $\mu$m and 1 $\mu$m.

As already mentioned, Sc may be replaced at least partially by a series of other metals. As a result, not only is it possible to control the costs inherent in the manufacture of the intermediate layer 5, it is also possible to make adjustments so as to select the properties of this intermediate layer 5.

Elements which may be considered as substitute elements for Sc are those which are able to form inter-metallic bonds with aluminium, similar to $Al_3Sc$. As a result, it will in turn be possible to precipitate these inter-metallic bonds from the so-called "solid solution" in aluminium and these precipitations will have a positive effect on the strength of the Al matrix.

As a III A element, Sc has chemical similarities to Y, the lanthanides and specific transition elements (rare earths). Similarly to scandium, Y, Dy, Ho, Er, Yb and Lu, for example, form $Al_3Sc$ crystallite and these phases are partially isotypical of the $Cu_3Au$ type. Furthermore, as stated in U.S. Pat. No. 4,874,440 A, the lattice parameter of the cubic primitive unit cell for these precipitations is of a value which more or less corresponds to that of $Al_3Sc$. At the same time, the differences relative to the cubic face-centred lattice of the Al matrix are not that significant, which means that coherent phases can occur embedded in the aluminium matrix. Clearly, the Sc might not be fully replaced by said elements and instead combined crystals of the $Al_3M_{1-x}M'_x$ type will form.

If the difference in electron negativity between aluminium and the above-mentioned lanthanide elements or their metal radii are also compared, it would be conceivable and is indeed possible to replace the Sc at least partially by these elements or it would be possible for all metals to form ternary, quaternary or even higher combined crystal series with one another.

Details to this effect are to be found, for example, in the article entitled "Explanatory Alloy Development in the System Al—Sc—X" (Ralph R. Sawtell and J. W. Morris, Jr.; Dispersion Strengthened Aluminium Alloys; Edited by Y. -W. Kim and W. M. Griffith; The Minerals, Metals & Material Society, 1988; P. 409–420).

Elements from the actinide group may also behave in a similar way.

Although transition elements such as Hf, Nb, Ta, La are significantly larger than Sc, they may nevertheless exhibit behaviour similar to Sc in aluminium alloys, which can be attributed to elastic effects.

Transition elements typically crystallise in structure types other than the above-mentioned $Cu_3Au$ type, for example in the cubic $Mg_2Cu$ type, of a Laves phase or the orthorhombic AlDy type.

However, combined crystal formations would also be conceivable and the properties could be adjusted by adding transition elements, thereby increasing the strength, for example, as a result. This being the case, the transition elements may be almost entirely absorbed in the $A_3M$ phases, which may increase the strength of Al—Sc alloys, for example.

Clearly, it would also be possible to crystallise the elements of lanthanides in other types of structure, as is the case with the $Al_3Dy$ type mentioned above, for example, although an important factor in producing coherent phases appears to be that the lattice constants of these $A_3M$ phases must have a value more or less the same as that of the lattice constants of cubic face-centred aluminium.

In addition to the elements mentioned above, however, the Li and Zr elements may also form phases of the $A_3M$ type in the aluminium matrix. Lithium may be used to avoid producing a significant increase in the density of the aluminium alloy. Moreover, it would be possible to vary, in particular increase, the E-modulus of the Al—Sc alloy by adding lithium.

As established in the article entitled "Influence of the particle size recrystallization and grain growth in Al—Mg—X alloys" (J. S. Vetrano, S. M. Beuemmer, L. M. Pawlowski, I. M. Robertson; Materials, Science and Engineering A 238; 1997; 101 ff), zirconium may be substituted for scandium in a quantity of up to 50%-atom. More heat-resistant precipitations can be produced, the size of this crystallite being largely independent of the homogenisation temperature after casting, for example, and may lie within the range of between 50 nm and 150 nm. $Al_3(Zr, Sc)$ precipitations of this type may prevent recrystallisation almost up to the melting point of the aluminium alloy, which means that the capacity of alloys of this type to withstand high temperatures and hence the resultant multi-layered material 1 can be improved.

By adding Zn, however, it is also possible to modify the form of resultant primary aluminides, for example Mn-, Fe-, Cr-aluminides, etc., for example from the needle shape to spherical shapes. As a result, alloys of this type are also able to withstand higher temperatures since aluminides of a rounded shape form fewer recrystallisation seeds of a rounded shape than of a needle shape and the recrystallisation behaviour of alloys of this type can be optimised due to the cooperation of Sc and Zr.

In addition to the metals mentioned above, however, there is a whole series of other elements which may be added, the explanation below attempting to give a general outline of how these affect the respective alloys.

Cu, Mg, Si and Zn are absorbed by aluminium in solid solution, which may result in the occurrence of aluminium-rich mixed crystals. Cu or Cu and Mg, together with Al for example, form what are known as thermo-settable Kent alloys, which can be readily formed and rolled. Cu also has the effect of strengthening the matrix due to hardening of the mixed crystals. More information on this aspect can be found in the conference report entitled "The effect of Scandium on the age-hardening behavior of an Al—Cu alloy" (The fourth international conference on aluminium alloys; M. Nakayama, Y. Miura, P. 538 ff; 1994). $Al_2Cu$ and $Al_3Sc$ crystallite precipitate independently of one another, thereby avoiding any heterogeneous seed formation. However, precipitation of these crystallites commences almost simultaneously.

At this stage, it should be pointed out that the precipitation of $Al_3M$ phases, in particular $Al_3Sc$, usually commences prior to the precipitation of aluminides of other types and these precipitations can therefore form a crystal seed for the latterly mentioned aluminides. However, as a result of this early precipitation, it is also possible to distribute $Al_3Sc$ crystallite 12 or corresponding precipitates in a fine dispersion in the aluminium matrix, especially if the $A_3M$ phases do not grow any further after the initial formation of seed but form a plurality of individual crystal seeds.

$Al_3Sc$ crystallites 12 may grow to a size of 10 nm and as a result remain finely and almost uniformly dispersed. Consequently, as mentioned above, over-ageing of these alloys can be largely prevented (see, for example, "The ageing behavior and tensile properties of Al—Sc alloy"; The third International Conference on Aluminium Alloys; T. Tan, Z. Zheng, B. Wang, Page 290 ff; 1992) and the thermal stability increased. $Al_3Sc$ crystallites 12 usually only grow to 100 nm if they are not dissolved during solution annealing.

Adding Mg alone to alloys of this type does not normally impart hardening capacity.

Si and Mg may form an inter-metallic compound $Mg_2Si$, which is also soluble in the aluminium matrix depending on temperature and can lead to alloys capable of hardening. Al—Si mixed crystals can increase strength. When adding Mg, however, care should be taken to ensure that the respective proportion by weight is not too high, which would cause $Al_3Mg_2$ phases to precipitate at the different grain boundaries, which can lead to inter-crystalline corrosion.

Due to the precipitation of $Al_7Cr$, for example, Cr may help to produce finer gains as well as Zr. Cr is barely soluble in Al and the creep resistance is enhanced due to precipitation of $Al_7Cr$. As a result, the hardness and strength of aluminium alloys of this type at high temperature can be improved. Furthermore, iron may be bonded due to $Al_7Cr$, thereby preventing a precipitation of $Al_3Fe$ needles. Needle formation of this type affects the mechanical properties of Al alloys and under certain circumstances can lead to embrittlement.

However, in combination with Mn, Fe forms aluminides which help to impart strength at higher temperatures.

Co is also insoluble in Al but can increase creep resistance due to the precipitation of $Al_9Co_2$ and also bond Fe.

Cu may increase the tensile strength of the aluminium to a large degree. Alloys containing large amounts of copper, for example, may be hardened by quenching at almost 555° C.

Like Co and Fe, Ni is insoluble in Al but can increase creep resistance and strength at higher temperatures as with Co for example, due to precipitations of $Al_3Ni$.

Like Zr, the elements Cr, Hf, Ti, V and Mn may be added to Al alloys in order to produce a finer grain, in particular to control the grain structure.

Added Mn has a solidifying effect and improves resistance to corrosion, which means that the recrystallisation temperature can be increased accordingly. Furthermore, as mentioned above, especially with a small Fe content, the formation of long-spiked brittle $Al_3Fe$ needles can be prevented as the iron is absorbed by the more favourably shaped $Al_6Mn$ crystals.

Using the elements Sn, Sb, Pb and Bi, the so-called soft-phase formers, the properties of the intermediate layer 5 can be adjusted to co-operate with those of the anti-friction layer 4 so that a good bond is produced between the individual layers of the multi-layered material 1 and in particular so that the hardness of the anti-friction layer 4 increases in the direction of the base shell 7.

The hardening capacity of Al alloys can be varied with the aid of Ag, Au, Pd and Pt and Al—Ag alloys can be hardened by precipitation of the $AlAg_2$ equilibrium phase, for example.

The elements W, Ta, Re, Mo, Nb and Ca can also have a positive effect on the plastic properties, in particular the deformability, of Al alloys of this type.

Be, particularly in multi-element alloys, improves the fine grain structure of the precipitations from over-saturated solid solution phases.

The elements In, Ge and Te can be used to vary the properties of the aluminium alloy used for the intermediate layer 5 still further so that it combines to a certain extent both the properties of the anti-friction layer 4 and the base shell 7.

As already mentioned, the multi-layered material 1 may comprise the anti-friction layer 4. All materials and alloys which are suitable for the anti-friction layer 4 of the friction bearing 2 may be used as the materials of the anti-friction layer 4. Bearing materials of this type should have good sliding properties, a good ductility, a capacity to embed foreign particles, etc., for example. In addition, they should exhibit corresponding properties of strength.

Suitable materials for anti-friction layers 4 of this type are, for example, aluminium alloys with a corresponding proportion of soft-phase formers, e.g. Pb, Sn, Sb, Bi, etc. For example, in addition to aluminium, the anti-friction layer 4 may also contain tin as the main alloying element, in which case the proportion of tin will be in the range of between 5% by weight and 45% by weight, preferably between 14% by weight and 40% by weight, in particular between 16% by weight and 32% by weight.

In addition to Sn, however, a whole series of other alloying elements may be incorporated, in which case their proportion as a total may be at most 11% by weight relative to the total alloy. For example, at least one alloying element from a group containing Mn, Fe, Cr, Zr, Co and Zn may be alloyed with at least one alloying element from a group containing Pb, Bi, Sb and In.

However, the anti-friction layer 4 may also be provided as an aluminium alloy with at least 16% by weight of tin and a total of at most 11% by weight of other elements, such as Mg, Zn, Pb, Bi, Li, Sb, In, Fe, Cr, Mn, Cu or similar.

The above-mentioned elements may be present in the alloy individually, i.e. they need not necessarily be combined, although this poses a restriction in that whenever an element from the group Mg and Zn is used, an element from the group Pb and Bi must be incorporated in the alloy.

The proportion of Cu may be between 0.65% by weight and 1.80% by weight, preferably between 1.35% by weight and 1.45% by weight, in particular 1.44% by weight, that of Mn between 0.25% by weight and 0.75% by weight, preferably between 0.35% by weight and 0.50% by weight, in particular 0.47% by weight, that of Fe between 0.15% by weight and 0.55% by weight, preferably between 0.18% by weight and 0.28% by weight, in particular 0.24% by weight and that of Cr between 0.05% by weight and 0.18% by weight, preferably between 0.07% by weight and 0.15% by weight, in particular 0.08% by weight. The rest making up 100% is Al with the usual impurities occurring within the range at which the raw material is broken down and inherent in the production process.

In another embodiment of the invention, an alloy of the following composition is used, the figures being given as percentages by weight:

| Sn | 22.1 | Fe | 0.24 |
|---|---|---|---|
| Cu | 1.44 | Cr | 0.08 |
| Mn | 0.47 | Pb | 0.20 |
| Bi | 0.12 | Zn | 1.20 |
| Mg | 0.50 | Al + impurities | to make up 100. |

This composition is, of course, only one of many examples of different variations, too numerous to list here. However, this does not mean that the invention is limited to this example.

Characteristic of alloys of this type based on the specified limits of elements incorporated in the alloy is the fact once the constituent elements have been melted and then cooled, a precipitation of what are referred to as hard particles occurs, which form bonds, for example an aluminide bond, containing a multi-component system. These hard particles on the one hand assume the hardness function of the alloy and on the other ensure that, if a high proportion of tin is present, a coherent network of tin is prevented from forming, which would be highly susceptible to disrupting the matrix structure and hence the structural strength. The strengthening of the aluminium matrix is, however, largely dependent on the morphology of these inter-metallic phases. Since in the case of annealing to produce spheroids, such as used as a means of minimising the friction effect of aluminium alloys containing hard particles of silicon for example, disadvantages can be anticipated with regard to precipitation and compacting of the tin, elements such as antimony, for example, are added to the alloy in order to reduce the scoring effect of the hard particles.

As a result of the special combination of elements in the matrix alloy, in which the content of aluminide formers which are not readily soluble is reduced to a minimum, elements can be introduced to strengthen the matrix, which will be less restricted in terms of dissolving in the aluminium matrix. It is possible to act on the tensions at the boundary surface of the Sn by adding elements from the group consisting of Pb, Bi, Sb and In and the wettability of the aluminium and hence the aluminium matrix as a whole can be acted on by adding elements from the group consisting of Mg, Zn, Li so that when the aluminium matrix hardens, the tin cannot precipitate on the grain boundaries of the matrix as a coherent network. Interrupting the network structure of the tin phase therefore causes a change in the pattern structure and advantageously increases the structural strength of the alloy and hence the bearing element, additionally improving formability.

In this connection, it has proved to be of particular advantage to use Al—Sc alloys for multi-layered materials 1 of this type, which means that it is also possible to use new, higher-strength bearing materials for the intermediate layers 5, whose properties can be matched to the mechanical properties of the anti-friction layer 4 and the base shell 7, for example.

In order to produce the desired effect, the elements, predominantly soluble in tin or predominantly soluble in aluminium, are incorporated in the alloy in a quantity dependant on the tin or aluminium content, which is determined by the maximum solubility of the individual elements at eutectic temperature. The proportion of the respective element from the group of elements containing Sb and In in addition to Pb and Bi should be between 10% and 75% of the maximum solubility of the respective element in the total tin content, but the total proportion of this element group should be at least 50% and at most 350% of the maximum solubility of the element group that is at least soluble in tin. The proportion of the respective element from the group of elements containing Li in addition to Mg and Zn should be between 6% and 50% of the maximum solubility of the respective element in the total aluminium content but the total proportion of this element group should be at least 25% and at most 150% of the maximum solubility of the group element that is at least soluble in aluminium.

The specified upper and lower threshold values for the proportions of elements relative to the tin or aluminium content represent the limits within which the change in the tensions of the boundary surfaces will prevent tin from forming a coherent network structure without any fear of a detrimental inter-reaction with the elements of the matrix alloy. In this connection, however, it should be borne in mind that a proportion of element above the maximum solubility may also actually be of use in the context of the specified limits because these elements in fact already start to act on the smelt as it gradually hardens.

In order to demonstrate the advantages of the Al—Sc bearing alloy as compared with a conventional friction bearing material, a standard friction bearing material containing 20% by weight of tin, 0.9% by weight of copper and the rest being aluminium with the usual impurities of an aluminium alloy will be compared with the composition given above.

However, this does not mean that friction bearing materials containing 20% by weight of Sn, 0.9% by weight of Cu and the remainder being Al can not be used in the multi-layered materials 1 proposed by the invention. The point is merely intended to demonstrate that Al—Sn bearing alloys containing spheroid-type particles in the Sn-soft metal phase can exhibit higher strengths, bringing the added advantage of increasing the strength of the intermediate layer 5. Clearly, bearing materials of a "mean value" may be used for the anti-friction layer 4 as necessary, particularly if the demands on the anti-friction layer 4 are not very high, in which case it would be more appropriate to use bearing materials of this type for reasons of cost, for example.

The two alloys to be tested were cast under the same conditions in a horizontal continuous casting process to produce a strip 100 mm wide and 10 mm high. The heat was dispersed during the hardening process in both cases on the basis of the selected dispersion conditions of between 3.4 J/s to 3.7 J/s. Since the highest possible overall deformation can be produced without interruption by intermediate annealing of bearing materials made from an aluminium alloy to produce advantageous mechanical and tribological properties, the deformability of the two alloys was tested. To this end, the known friction bearing material was subjected to a heat treatment at 350° C. for a period of 3 hours. This annealing process produces a stronger globulisation of the tin particles. The alloy proposed by the invention was tested without heat treatment at a temperature of 350° C. over a period of 3 and 19 hours. In order to conduct these tests, the casting skin was removed from the samples, both of the known aluminium alloy and that proposed by the invention, by milling. The sample cross section was then respectively 80×8 mm$^2$. Permissible roll reductions without intermediate annealing were defined with these samples.

Initial macroscopic tears had already started to occur at a reduction of just over 30% in the known friction bearing material. At a deformation of up to 45%, these rapidly spreading tears soon caused the sample to be totally destroyed. From the hardness measurements taken on the rolled surface after each pass, it was observed that after reaching a maximum hardness, the hardness started to drop as a result of damage to the pattern structure from pass to pass. The material proposed by the invention, on the other hand, exhibited an increased hardness from one pass to the next.

From the behaviour described above, it can therefore be concluded that the structural properties, in particular strength, had improved significantly. In the sample overaged by heating, macroscopic tearing was not perceptible until a total deformation of over 55%. In the sample which had not been heat-treated, such tearing did not occur until after an overall deformation of more than 60% and was not observed in the sample that had been subjected to 3 hours of heat treatment until after a total deformation of 70%. By contrast with the known friction bearing material, these tears did not cause the samples to tear through altogether.

The aluminium alloy in the cast state after cooling was found to have a Vickers hardness of 42 HV2 in and transversely to the casting direction. After plating the steel of the base shell 7 with the anti-friction layer 4 using rolls rated for a 45% pass and a temperature treatment at 350° for 3 hours, the hardness was found to be 52 HV2 in and transversely to the casting direction. After plating on steel by means of rolls and an annealing treatment at 300° C. to 400° C. for two to five hours, preferably at 350° C. for three hours, the hardness of the aluminium alloy in and transversely to the rolling direction should be at least 20% higher in each case than it is transversely to the casting direction in the cast state. Furthermore, the hardness in and transversely to the rolling direction should be at a value of 48 HV2 to 88 HV2, preferably 50 HV2 to 54 HV2. After plating with the anti-friction layer by rolling with at least a 40% pass in at most two passes or at least a 25% pass in at most one pass followed by heat treatment at 300° C. to 400° C. for two to five hours, preferably 350° C. for three hours, the hardness in and transversely to the rolling direction should be at least 175 HV2. From these measurements, it can therefore be concluded that the aluminium alloy proposed by the invention has the advantageous property of being strengthened by forming, in particular by rolls, and hence also for use in high-speed motors. This is also attributable to the fact that alloys with an aluminium base as proposed by the invention have a sufficiently high content of soft phases so that aluminium matrix alloys of this type overall have tribological properties, which satisfy the desired requirement of allowing increasingly longer periods between maintenance. The content of soft phases means that damage to bearing and shaft caused by extensively soiled lubricant entraining solid particles caused by friction is avoided.

However, another advantageous property of this aluminium alloy and the bearing materials in which it is used is the fact that it subsequently hardens, e.g. in motors, because of the temperature load during operation, which, as is known, can only be avoided to a limited extent by lubricant. As a result, the finely distributed non-bonded tin particles can coalesce to form larger particles as a result of multiple temperature changes—tin is known to have a melting point of 232° C., a temperature rapidly reached by shafts during operation—and be precipitated.

Again, this demonstrates the advantage of using Al—Sc alloys with their good mechanical properties, whereby, for example, the hardness of the intermediate layer 5 can advantageously be adapted to the hardness of the anti-friction layer 4 so that Al—Sc alloys of this type can also be used for higher-strength bearing materials.

Multi-layered materials I proposed by the invention can also be made from any method known in the state of the art. For example, the aluminium alloy for the intermediate layer 5 and/or the aluminium alloy for the anti-friction layer 4 can be made using a continuous casting process and the blanks made to a predeterminable thickness. In order to make the individual layers for the multi-layered material 1, these blanks can be rolled to a predetermined thickness, for example. The rolling process may be effected in several steps, the thickness of the blank being reduced by approximately 10% to 70% with each pass, and this process is repeated until the layers are of the required wall thickness.

However, it would also be possible, particularly when producing the multi-layered material 1 proposed by the invention, to operate the rolling process in such a way that two or more different and/or identical layers are placed one on top of the other, the rolling and plating process producing a solid join between the individual layers. For example, the surface 11 of the Al alloy for the anti-friction layer 4 on the Al-alloy for the intermediate layer 5, in other words an Al—Sc alloy and the surface of the anti-friction layer 4 lying opposite the surface 11, may be covered, for example with a pure aluminium sheet. This latter approach prevents soft phases, which generally have a melting temperature below or close to the annealing temperature, from escaping from the aluminium matrix of the bearing alloy, which would then be lost during subsequent annealing of the resultant layered joint. In order to impart the mechanical strength needed for use in a friction bearing 2, an additional step may be incorporated in which the base shell 7, for example steel, is applied to the joined unit by another rolling process, thereby producing a bond. After another subsequent heat treatment of the resultant multi-layered material 1 now comprising three layers for example, the final shape is imparted thereto in a die, to produce the half-shell illustrated in FIG. 1, for example. The aluminium layer used to prevent the tin from escaping can then be removed from the anti-friction layer, for example by boring. Final finishing processes such as breaking off the edges, forming the groove 8, etc., can then follow.

However, it would also be possible to temper the Al-based alloy or joining material after each overall forming of at least 25% and at most 91% in one or more forming steps at a temperature in the range of between 85° C. and 445° C., preferably between 150° C. and 400° C.

Furthermore, it would be possible to operate a plating process in a rolling mill to reduce the thickness of the multi-layered material and the respective intermediate products within a range of between 20% and 75% with each pass, preferably between 25% and 50%.

In addition to the known methods, however, a series of other processes could be used, such as the CVD process (Chemical Vapour Deposition), various vacuum coating techniques such as vapour deposition, ion plating, cathode sputtering, galvanic techniques, dipping processes without current, spray coating methods, etc. Laser techniques might also be used, for example.

In all the methods used, the base shell 7 and/or the intermediate layer 5 and/or the anti-friction layer 4 may be selected as the initial material that will then be plated or coated.

It goes without saying that any specific intermediate steps which might be needed can be incorporated, such as de-greasing the surfaces, for example with solvents.

As already mentioned, the individual layers, in particular the Al alloys, may be subjected to a heat treatment during the manufacturing process, especially after a roll reducing process, in order to release tension induced by deformation. For example, the intermediate layer 5 may be subjected to a heat treatment for 0.5 to 48 hours at a temperature from 85° C. to 445° C., in which case the value of the hardness of the intermediate layer 5 after this heat treatment will advantageously be no more than 35% below the hardness value exhibited by the intermediate layer 5 prior to massive forming, e.g. by rolling, smelting, die pressing or similar. The hardness value for this intermediate layer 5 after massive forming may be in the range of between 70% and 80% of the hardness value prior to massive forming, for example, in which case a heat treatment will be applied for 1 to 24 hours at a temperature in the range of between 100° C. and 350° C.

The thickness of the individual layers may be between 0.3 mm and 0.6 mm, preferably 0.4 mm to 0.5 mm in the case of the anti-friction layer 4, for example, in the range of between 0.05 mm and 0.2 mm, preferably 0.1 mm and 0.18 mm in the case of the intermediate layer 5, and between 0.8 mm and 1.8 mm, preferably between 1.0 mm and 1.5 mm in the case of the base shell 7. Clearly, the individual thicknesses of the layers are given by way of illustration only since the overall thickness of the multi-layered material 1 may be adjusted to suit any specific application, which means that the thicknesses of the individual layers may also be adjusted accordingly.

After plating, the hardness of the anti-friction layer 4 may be in the region of between 30.0 HV2 and 110 HV2, preferably between 45.0 HV2 and 85 HV2, and after heat treatment in the range of between 25.0 HV2 and 85.0 HV2, preferably between 40.0 HV2 and 75. HV2,that of the intermediate layer 5 after plating in the range of between 55.0 UMHV20p to 100 UMHV20p, preferably 60 UMHV20p and 85 UMHV20p, and after heat treatment between 45 UMHV20p and 80 UMHV20p, preferably between 55 UMHV20p and 75 UMHV20p, and that of the base shell 7, made from steel for example, in the range of between 110 HV2 and 260 HV2, preferably between 150 HV2 and 240 HV2 after plating and, after heat treatment, in the range of between 105 HV2 and 240 HV2, preferably between 145 HV2 and 235 HV2.

By way of comparison, an intermediate layer 5 made from pure aluminium, such as known from the prior art for example, has a hardness of 45 UMHV20p prior to heat treatment and approximately 29 UMHV20p after heat treatment, in other words a significantly lower hardness than the Al—Sc alloy of the intermediate layer 5 proposed by the invention. UMHV20p means UltraMicroHardnessVickera20pond.

The heat treatment used to attain the above-mentioned values is applied for three hours at approximately 350° C. However, tests conducted at higher temperatures, for example 350° C. to 400° C., did not show any significant change in the hardness of the intermediate layer 5, which, as mentioned earlier, is attributable to the fact that the recrystallisation temperature for Al—Sc alloys is in the region of approximately 600° C.

As other measurements showed, the hardness of the intermediate layer 5 is at least more or less identical both in the casting direction and transversely to the casting direction, which is explained by the finely dispersed distribution of the $Al_3Sc$ crystallite 12 across the entire volume of the Al alloy.

At this point, it should be reiterated that all the compositions listed for Al alloys are given by way of example only and there are any number of combinations to choose from. However, this does not mean that the invention is restricted to these combinations or Al alloys and, on the contrary, all possible combinations fall within the scope of the invention.

Figure 3:
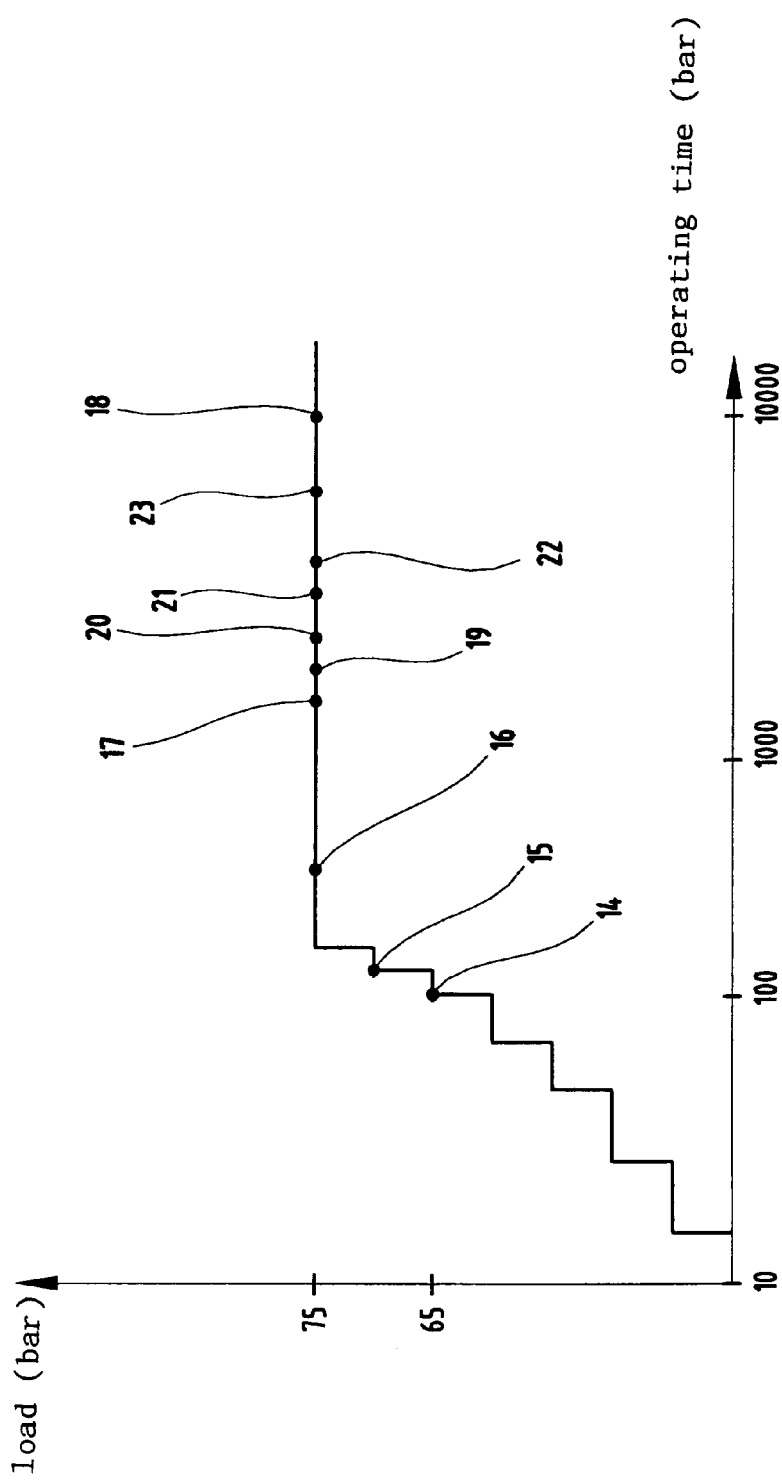
FIG. 3 is a graph illustrating the bearing behaviour during service of friction bearings with anti-friction and intermediate layers of different aluminium alloys plated on a layer of steel, as the bearing load changes over a period of time.

FIG. 3 gives a logarithmic scale, with the load in bar plotted on the ordinate and the operating time in minutes plotted on the abscissa.

It is known that the load on a friction bearing 2, in particular stress due to temperature and/or pressure, during what is referred to as a run-in phase as well as afterwards will bring about a change in strength, the strength being dependent on the constituent elements of the alloy. Depending on this run-in time and the time taken to reach specific threshold values, no further significant changes in strength will occur throughout the service life, which ends when a bearing of this type becomes unusable due to material fatigue.

The layered structure proposed by the invention and the effect it has on the behaviour of bearings of this type will be described in more detail below with reference to specific examples of different layer structures used for friction bearings 2 of this type.

In all the friction bearings 2 described as examples below, steel is always used for the base layer 6 so that this base layer 6 will no longer be mentioned in examples 1 to 6 below and can be implicitly taken as read. Furthermore, the individual layers in the friction bearings 2 described below are joined to one another so that they can not be displaced.

Example 1: In this friction bearing 2, the anti-friction layer 4 is made from an aluminium alloy incorporating tin, in particular from AlZn 4.5.

Example 2: In this three-layered friction bearing 2, an intermediate layer 5 of pure aluminium is used with an anti-friction layer 3 made from an Al—Sn alloy, e.g. AlSn6Cu.

Example 3: This example relates to a friction bearing 2 with an intermediate layer 5 made from pure aluminium and an anti-friction layer 4 made from an Al—Sn alloy, in particular AlSn20Cu.

Example 4: For this friction bearing 2, an intermediate layer made from a CuPb alloy is used, onto which an anti-friction layer of AlSn20 is applied by sputtering.

Example 5: The friction bearing 2 in this example is an improved version of example 1, but in this case an AlZn alloy is no longer used for the anti-friction layer 4 but is used instead for the intermediate layer 5, whilst the anti-friction layer is an AlSn20 alloy. Instead of the AlZn alloy, it would also be possible to use AlSc alloys proposed by the invention for the intermediate layer 5 in this example.

Example 6: This final example relates to a friction bearing 2 with an intermediate layer 5 as proposed by the invention made from an AlSc alloy. An Al alloy was used the for anti-friction layer 4 which may contain up to 32% by weight of Sn as the main alloying element and which additionally contains a hard substance selected from at least one element from the group of elements containing Fe, Mn, Ni, Cr, Co, Cu, Pt, Mg, Sb, W, Nb, V, Ag, Mo or Zr. The hard substance may be an inter-metallic phase, e.g. by forming aluminide in the boundary regions of the matrix so that the tin network resulting from the high tin content can be interrupted. By preference, the hard substance is spherical or cuboid. For example, in addition to Al with its inherent impurities, the alloy may contain 22.1% by weight of Sn, 1.44% by weight of Cu, 0.47% by weight of Mn, 0.24% by weight of Fe, 0.08% by weight of Cr and 0.5% by weight of Mg.

In order to test the bearing service behaviour of a friction bearing 2 and classify it into categories of use, service behaviour for bearing purposes can be tested and monitored using predefined test methods. In order to simulate changes in stress, a shaft rotating at a predefined rotation speed for the cylinder size used, likely to causes stress to the bearing housing, can be operated at a hydraulic pressure of 75 bar. Once the maximum bearing load is reached, the test is continued until the bearing becomes so damaged due to compression of the anti-friction layer 4 or burring in the region of the anti-friction and intermediate layers 4, 5 or due to friction, that it has to be replaced. Details incorporated in the definition as to the point from which this damage is so severe that the bearing can no longer be used are established prior to every individual test series.

FIG. 3 illustrates service behaviour in a bearing application of the embodiments of the individual friction bearings 2 given as examples 1 to 6 above.

As may be seen from the graph, showing for example a simple bearing structure of a type described in example 1, known from the prior art, this type of friction bearing 2 fails even before reaching maximum load denoted by time 14—as shown in the graph—due to friction at the bearing point.

Better service behaviour is already in evidence in the case of another embodiment of a friction bearing, also known from the prior art, having a triple-layered structure, in which the base shell 7 is made from steel, the intermediate layer 5 from pure aluminium and the anti-friction layer 4 from Al alloys incorporating tin—as detailed in examples 2 and 3.

Whilst the aluminium alloy with a lower tin content described in example 2 also fails even before reaching maximum load at time 15, the more highly alloyed Al remains resistant over a longer period of maximum load up to a time 16 before the bearing is crushed or up to a time 17 when the bearing is worn.

As known from the prior art, very high service periods for bearings can be achieved with a bearing structure as outlined in example 4, since a friction bearing 2 of this type does not fail until after a period of approximately 10,000 minutes, in other words at time 18. Bearings of this type which proved capable of a long service life in this comparative test are also referred to as "passed components".

Example 5 illustrates the effect which the material used for the intermediate layer 5 has on the properties of a friction bearing 2. Whilst a friction bearing 2 with an intermediate layer 5 of an AlZn alloy has already failed by time 19, service life can be significantly increased if this AlZn intermediate layer is replaced by an intermediate layer 5 made from an AlSc alloy as proposed by the invention. This is illustrated by times 20, 21 in FIG. 3, which denote the point at which the friction bearing 2 breaks or fails.

Finally, the times 22, 23 show the test results for a friction bearing 2 in which the intermediate layer 5 is made from an improved AlSc alloy proposed by the invention on the one hand and an AlSn alloy with a high tin content is used for the anti-friction layer 4 on the other. In comparison with the anti-friction layer 4 of example 5, however, the tin network which forms as a result of the high proportion of tin in this high-strength AlSn alloy is interrupted by hard substances and the problematic effect which these hard substances would normally have due to shearing forces can be overcome if this hard substance is spherical or cuboid in shape.

The upshot of this observation is that, on the one hand, by using an intermediate layer as proposed by the invention with an AlSc base, a friction bearing 2 can be produced whose properties, in particular due to the combination of the intermediate layer 5 proposed by the invention with a high-strength anti-friction layer 4, are such that a long service life can be achieved, totally comparable with what are known as "high-tech" friction bearings 2 made using a sputtering technique, and, on the other that friction bearings 2 with a sustained service life can be produced more cheaply if an intermediate layer 5 as proposed by the invention is used.

For the sake of good order, it should finally be pointed out that in order to provide a clearer understanding of the structure of the multi-layered material 1 and the intermediate layer 5, they and their constituent parts have been illustrated out of scale to a certain extent and/or on an enlarged and/or reduced scale.

The tasks underlying the independent inventive solutions can be found in the description.

Above all, subject matter of the individual embodiments illustrated in FIGS. 1; 2; 3 can be construed as independent solutions proposed by the invention. The related tasks and solutions can be found in the detailed descriptions of these drawings.

List of reference numbers

1 multi-layered material
2 friction bearing
3 peripheral layer
4 anti-friction layer
5 intermediate layer
6 peripheral layer
7 base shell
8 groove
9 end face
10 side wall
11 surface
12 Al$_3$Sc crystallite
13 Al—Mn precipitation
14 time
15 time
16 time
17 time
18 time
19 time
20 time
21 time
22 time
23 time

What is claimed is:

1. A friction bearing having at least three layers of differing composition, at least one intermediate layer being made from an alloy with an aluminium base containing 0.015% by weight to 10% by weight of at least one element from the group consisting of Sc, Y, Hf, Ta, La, lanthanides and actinides and optionally a total of up to 12% by weight of at least one element from the group consisting of Li, Zn, Si, Mg or up to a total of 10% by weight of at least one element from the group consisting of Mn, Cu, Be, Ca, Zr, Mo, W, Ag or up to a total of 10% by weight of at least one element from the group consisting of Ti, V, Cr, Fe, Co, Ni or up to a total of 10% by weight of at least one element from the group consisting of Pd, Au, Pt, In, Ge, Sn, Pb, Sb, Bi, Te, and the remainder being formed by aluminum with smelt-related impurities.

2. The friction bearing as claimed in claim 1, wherein the alloy contains between 0.015% b weight and 3.25% by weight of at least one element from the group consisting of Sc, Y, Hf, Ta, La, lanthanides and actinides, relative to 100% by weight of alloy.

3. The friction bearing as claimed in claim 1, wherein the alloy contains between 0.015% and 2.5% by weight of at least one element from the group consisting of Sc, Y, Hf, Ta, La, lanthanides and actinides, relative to 100% by weight of alloy.

4. The friction bearing as claimed in claim 1, wherein the alloy contains between 0.015% and 1.0% of at least one element from the group consisting of Sc, Y, Hf, Ta, La, lanthanides and actinides, relative to 100% by weight of alloy.

5. The friction bearing as claimed in claim 1, wherein the alloy contains at least one element from the group consisting of Li, Zn, Si, Mg, in a proportion in total of a maximum of 6.5% by weight, relative to 100% by weight of alloy.

6. The friction bearing as claimed in claim 1, wherein the alloy additionally contains at least one element from the group consisting of Mn, Cu, Be, Ca, Zr, Mo, W, Ag in a proportion in total of a maximum of 10.0% by weight, relative to 100% by weight of alloy.

7. The friction bearing as claimed in claim 1, wherein the alloy contains at least one element from the group consisting of Ti, V, Cr, Fe, Co, Ni in a proportion in total of a maximum of 4.0% by weight, relative to 100% by weight of alloy.

8. The friction bearing as claimed in claim 1, wherein the alloy contains at least one element from the group consisting of Pd, Au, Pt, In, Ge, Sn, Pb, Sb, Bi, Te in a proportion in total of a maximum of 6.5% by weight.

9. The friction bearing as claimed in claim 1, wherein after a heat treatment for a period of 0.5 to 48 hours and at a temperature in the range of between 85° C. and 445° C., the intermediate layer has a hardness whose value is not more than 35% below the hardness value as measured prior to the heat treatment after massive forming.

10. The friction bearing as claimed in claim 1, wherein after a heat treatment for 1 to 24 hours at a temperature in the range of between 100° C. and 350° C., the intermediate layer has a hardness whose value is in the range of between 70% and 80% of the hardness value as measured prior to the heat treatment after massive forming.

11. The friction bearing ad claimed in claim 1, wherein after a heat treatment, the intermediate layer has a Vickers hardness in the range of between 45 HV2 and 80 HV2.

12. The friction bearing as claimed in claim 1, wherein an innermost of the layers is an anti-friction layer consisting of an aluminium alloy with Sn as the main alloying element, the proportion of tin being in the range of between 5% by weight and 45% by weight.

13. The friction bearing as claimed in claim 12, wherein the anti-friction layer consists of an aluminium alloy with soft phases comprising Pb, Bi, Sb or Sn embedded in the aluminium matrix.

14. The friction bearing as claimed in claim 12, wherein the proportion of tin is in the range of between 16% by weight and 32% by weight.

15. The friction bearing as claimed in claim 12, wherein the anti-friction layer contains Cu in a proportion ranging between 0.65% by weight and 1.80% by weight, Mn in a proportion ranging between 0.25% by weight and 0.75% by weight, Fe in a proportion ranging between 0.15% by weight and 0.55% by weight, Cr in a proportion ranging between 0.05% by weight and 0.18% by weight.

16. The friction bearing as claimed in claim 12, wherein the anti-friction layer has a Vickers hardness in the range of between 25 HV2 and 85 HV2 after a heat treatment.

17. The friction bearing as claimed in claim 13, wherein the anti-friction layer contains in total at most 11% by weight of at least one additional alloying element from a group consisting of Mn, Fe, Cr, Zr, Co and Zn added to the alloy and at least one alloying element from a group consisting of Pb, Si, Sb and In.

18. A method of manufacturing a friction bearing as claimed in claim 1, wherein the intermediate layer made from a previously hardened material made by a casting process, an extrusion process or a continuous casting process is rolled with at least one other material.

19. A method as claimed in claim 18, wherein the layers of the friction bearing rolled together are tempered after every overall forming process by at least 25% and at most 91% in one or more forming steps at a temperature in the range of between 85° C. and 445° C.

20. A method as claimed in claim 18, wherein an anti-friction layer is applied on top of the intermediate layer or the intermediate layer is applied on top of the anti-friction layer and/or the intermediate layer is applied on top of a base shell by a rolling process, a CVD process, galvanic processing, cathode sputtering or a vacuum vapour deposition process.

21. A method as claimed in claim 18, wherein the thickness of intermediate products of the friction bearing is reduced by means of a plating process in a rolling mill in the range of 20% to 75%, with each pass.

* * * * *